(12) United States Patent
Dale

(10) Patent No.: US 7,210,743 B1
(45) Date of Patent: May 1, 2007

(54) SYSTEM FOR FACILITATING THREADING OF A SEAT BELT THROUGH A CHILD SAFETY SEAT

(76) Inventor: Matt Dale, 3500 Marjorie Way, Sacramento, CA (US) 95820

( * ) Notice: Subject to any disclaimer, the term of this patent is extended or adjusted under 35 U.S.C. 154(b) by 0 days.

(21) Appl. No.: 11/416,222

(22) Filed: May 2, 2006

(51) Int. Cl.
*B60R 22/00* (2006.01)

(52) U.S. Cl. .................. 297/468; 297/463.2; 297/482; 81/488

(58) Field of Classification Search ............. 297/250.1, 297/463.1, 463.2, 482, 468; 81/488
See application file for complete search history.

(56) References Cited

U.S. PATENT DOCUMENTS

| | | | |
|---|---|---|---|
| 4,312,539 A | | 1/1982 | Takada |
| 5,197,176 A | | 3/1993 | Reese |
| 5,312,159 A | * | 5/1994 | Essa et al. ................... 297/482 |
| 5,584,536 A | * | 12/1996 | White ......................... 297/482 |
| 5,620,231 A | | 4/1997 | Marker et al. |
| 5,733,004 A | | 3/1998 | Celestina-Krevh et al. |
| 5,902,015 A | * | 5/1999 | Allcock ................... 297/463.1 |
| 5,954,397 A | | 9/1999 | Czernakowski et al. |
| 6,382,730 B1 | * | 5/2002 | Closner ....................... 297/482 |
| 6,390,562 B1 | | 5/2002 | Takamizu et al. |
| 6,634,064 B2 | | 10/2003 | Finotti |
| 6,779,842 B2 | | 8/2004 | McNeff |
| 7,093,905 B1 | * | 8/2006 | George ..................... 297/463.1 |

\* cited by examiner

*Primary Examiner*—Peter R. Brown
(74) *Attorney, Agent, or Firm*—Thomas R. Lampe

(57) ABSTRACT

A device used for threading a seat belt through a child safety seat includes an elongated, double-ended threader member which is connected to the seat belt tongue and to webbing at a location spaced from the tongue. The webbing is then folded over to cover the threader member and the threader member is employed to push the tongue through a passageway in the child safety seat.

3 Claims, 2 Drawing Sheets

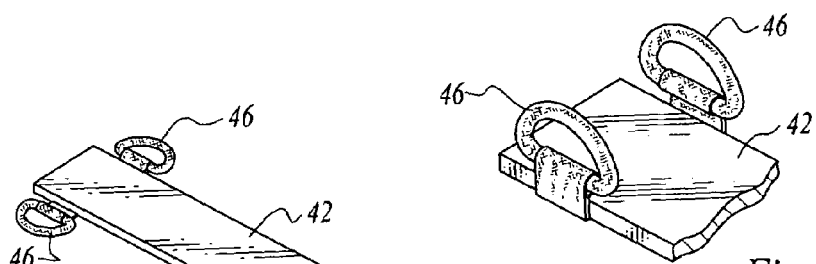
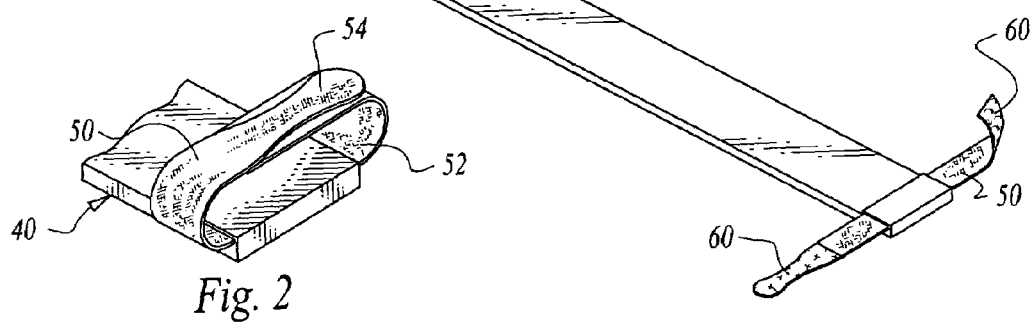
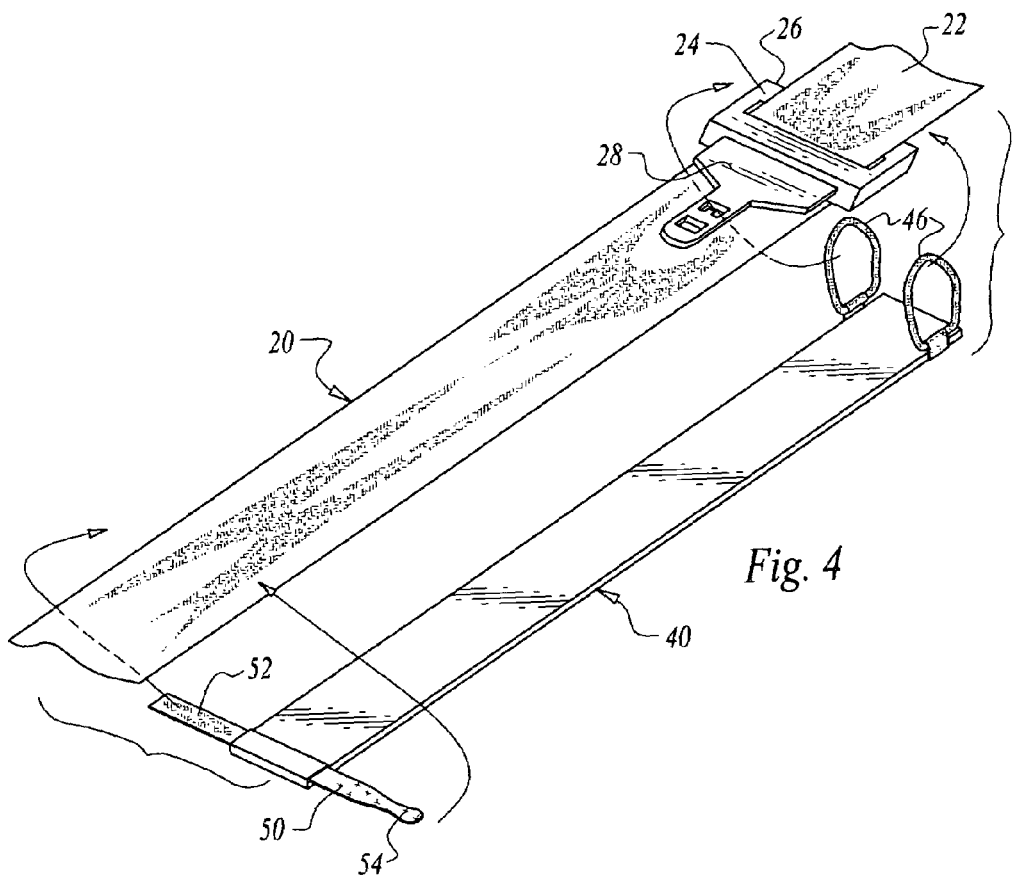

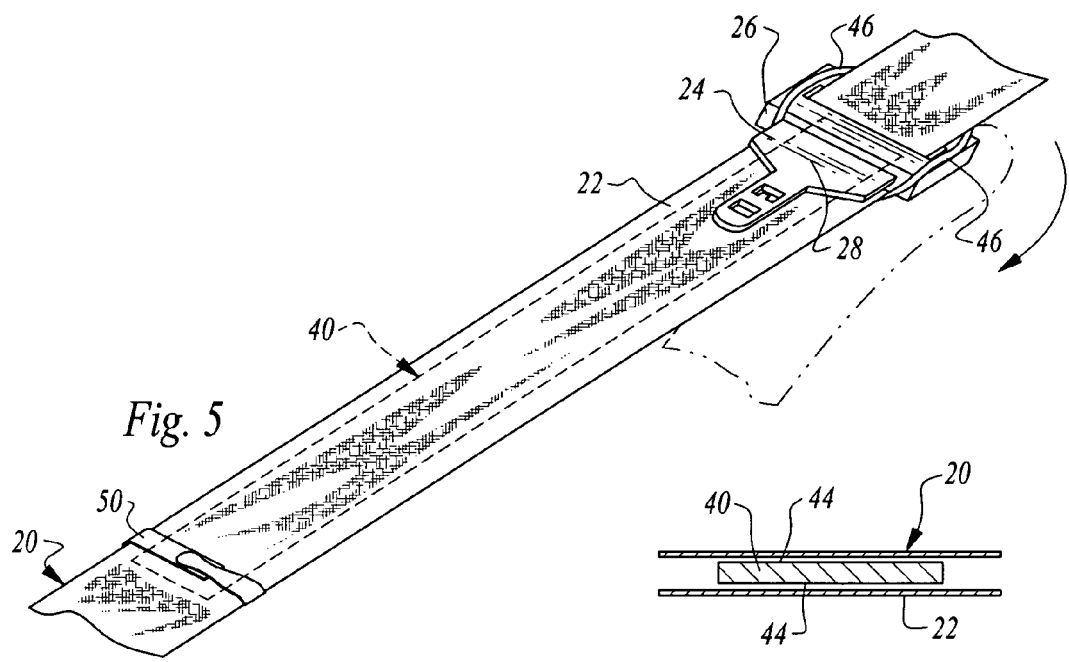
Fig. 5
Fig. 7
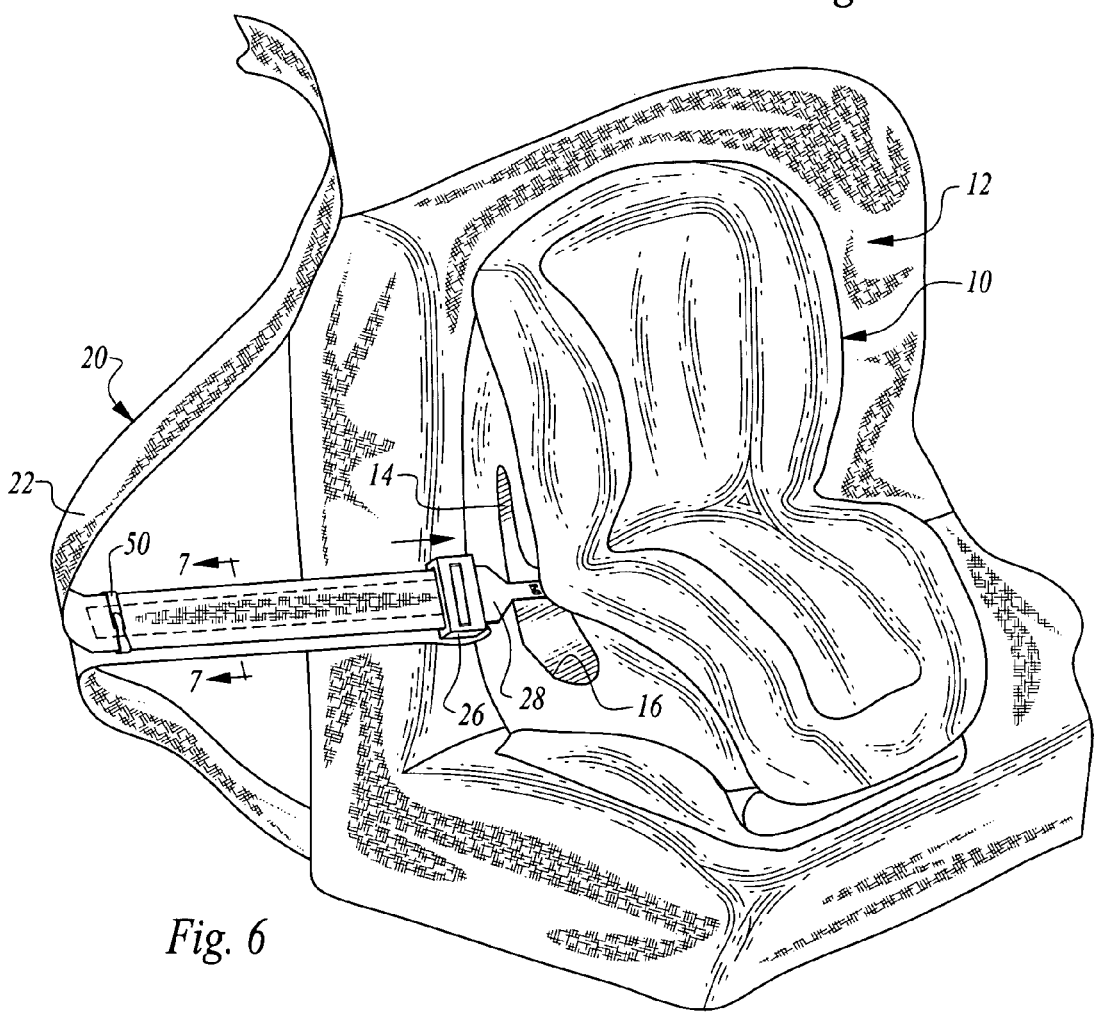
Fig. 6

US 7,210,743 B1

SYSTEM FOR FACILITATING THREADING OF A SEAT BELT THROUGH A CHILD SAFETY SEAT

TECHNICAL FIELD

This invention relates to a method and apparatus for facilitating threading of a seat belt through a passageway of a child safety seat.

BACKGROUND OF THE INVENTION

Various arrangements are known in the prior art for threading a seat belt through a child safety seat for the purposes of retaining the child safety seat in position on a passenger seat of a vehicle. Such arrangements have been devised since attachment of child safety seats can be a relatively difficult and arduous process, particularly since the seat belt normally is continuously biased by seat belt retraction mechanism of the vehicle in a direction opposed to the direction of threading. Also, passageways through child safety seats can be relatively restricted in size, adding to the difficulty of installing the child safety seat.

The following United States patents illustrate devices and tools of various types which are believed to be representative of the state of the art in this field: U.S. Pat. No. 6,634,064, issued Oct. 21, 2003, U.S. Pat. No. 6,779,842, issued Aug. 24, 2004, U.S. Pat. No. 4,312,539, issued Jan. 26, 1982, U.S. Pat. No. 5,733,004, issued Mar. 31, 1998, U.S. Pat. No. 6,390,562, issued May 21, 2002, U.S. Pat. No. 5,954,397, issued Sep. 21, 1999, U.S. Pat. No. 5,197,176, issued Mar. 30, 1993 and U.S. Pat. No. 5,620,231, issued Apr. 15, 1997.

DISCLOSURE OF INVENTION

The apparatus of the present invention is characterized by its relative simplicity, ease of use and low cost as compared to prior art arrangements. Because of its compact nature, the device of the present invention can be readily stored without taking up too much room; in fact, the device may suitably be retained in position on the seat belt with which it is to be employed both before and after actual use of the device during seat belt threading. It will not interfere in any way with the function and safety afforded by the seat belt when in use. Retention of the device on the seat belt will prevent it from being lost or misplaced, a common problem with tools and devices applied to the seat belt only at the time the threading operation takes place.

The invention includes a device for facilitating threading of a seat belt through a passageway of a child safety seat, the seat belt including seat belt webbing and a seat belt tongue mounted on the webbing.

The device includes an elongated, double-ended threader member. First connector structure is attached to the threader member for releasable connection to the seat belt tongue of the seat belt.

Second connector structure is spaced from the first connector structure and is attached to the threader member for releasable connection to the seat belt webbing of the seat belt.

The elongated, double-ended threader member, when the first connector structure is connected to the seat belt tongue and the second connector structure is connected to the seat belt webbing, is positioned alongside the seat belt webbing and operable to resist substantial flexing of the seat belt webbing between the first connector structure and the second connector structure.

The invention also encompasses a method of connecting a child safety seat by threading a seat belt having webbing and a tongue through a passageway of a child safety seat.

The method includes the step of positioning the elongated, double-ended threader member along the webbing of the seat belt. One end of the threader member is connected to the tongue of the seat belt.

The threader member is also connected to the webbing of the seat belt at a location spaced from the tongue to maintain the threader member in face-to-face relationship with the webbing between the tongue and the location.

The threader member is employed to push the tongue through an opening of the child safety seat communicating with the passageway and through the passageway along with the webbing until the tongue emerges from a second opening in the child safety seat in communication with the passageway.

Other features, advantages and objects of the present invention will become apparent with reference to the following description and accompanying drawings.

BRIEF DESCRIPTION OF DRAWINGS

FIG. 1 is a perspective view of a preferred embodiment of the device of the present invention;

FIG. 2 is an enlarged, perspective view illustrating connector structure at one end of the device;

FIG. 3 is an enlarged, perspective view of the other end of the device and illustrating connector structure at that location;

FIG. 4 is a perspective view illustrating the device just prior to connection thereof to the tongue and webbing of a seat belt;

FIG. 5 is a view similar to FIG. 4, but illustrating the device connected to the seat belt;

FIG. 6 shows the device pushing the tongue and webbing of the seat belt into an opening and passageway of a child safety seat; and FIG. 7 is a greatly enlarged, cross-sectional view taken along line 7—7 in FIG. 6.

BEST MODE FOR CARRYING OUT THE INVENTION

Referring now to the drawings, a representative, typical child safety seat is designated by reference numeral 10 (FIG. 6). The child safety seat is shown positioned on the passenger seat 12 of a vehicle. As is conventional, the child safety seat has a passageway 14 extending therethrough and terminating at openings 16 in the opposed sides of the child safety seat.

Reference numeral 20 designates a conventional automobile seat belt 20 which will be utilized to retain the child safety seat in place on the passenger seat. Seat belt 20 includes seat belt webbing 22 and a seat belt tongue 24 mounted on the webbing, the tongue being cooperable with a latch (not shown) comprising part of the seat belt assembly in the well known manner. The tongue 24, as is conventional, includes a wide tongue portion 26 and a narrow tongue portion 28.

The device of the present invention for facilitating threading of the seat belt through the child safety seat is designated by reference numeral 40. Device 40 includes an elongated, double-ended, strip-like threader member 42. Threader member 42 may be formed by any suitable material such as plastic or metal. The threader member is a substantially flat push element having opposed webbing engagement sides 44 for engagement with the seat belt webbing.

The device 40 also includes connector structure attached to the threader member 42 for releasable connection to the seat belt tongue 24. More particularly, this connector structure includes a pair of loop elements 46 spaced from one another and connected in any suitable manner to one of the ends of the threader member. The loop elements 46 in the illustrated embodiment are formed of flexible, elastic material. The loop elements 46 are positioned over the ends of the tongue wide portion 26 as shown in FIG. 4 and frictionally engage the wide tongue portion to maintain the seat belt tongue releasably connected to the device when the device is employed to push the seat belt tongue through the passageway as will be described below.

Connector structure spaced from the loop elements 46 is also attached to the threader member 42 for releasable connection to the seat belt webbing. In the arrangement illustrated, the connector structure for releasable connection to the webbing is located at the end of the threader member remote from the end where the loop elements are located.

The second connector structure is in the form of a securement strap 50 having two strap portions 52, 54. Strap portion connectors are provided for releasably connecting together the two strap portions, one suitable expedient for this purpose being synthetic loop and hook material, such as that sold under the trademark Velcro. Such material is designated in FIG. 3 by reference numeral 60.

In use, the threader member 42 is positioned along the webbing 22 as shown in FIG. 4. The loop elements 46 are then positioned over the opposed ends of the wide tongue portion 26. The strap portions 52, 54 are manipulated, brought together, and then secured at their ends as shown in FIG. 2 so that the strap extends about the webbing at a location spaced from the tongue. The threader member is now disposed in face-to-face relationship with the webbing between the tongue and the securement strap. The device is operable to resist substantial flexing of the seat belt webbing between the loop elements and the securement strap.

Next, the webbing is folded back or doubled over upon itself as depicted by the curved arrow in FIG. 5 so that superposed portions of the seat belt are formed. One portion is in face-to-face engagement with one side 44 of the threader member and the other webbing portion in engagement with the opposed side 44. That is, the threaded member 42 is sandwiched between the superposed portions of the seat belt webbing. This is illustrated in FIGS. 6 and 7.

FIG. 6 depicts the next step in the process, wherein the threader member is employed to push the tongue through an opening 16 of the child safety seat and thence through the passageway along with the webbing connected to the tongue until the tongue emerges from the other opening (not shown) in the child safety seat in communication with the passageway.

After the tongue emerges from the second opening, the threader member may be disconnected from the tongue while the user prevents retraction of the webbing back to the passageway by grasping the tongue. Alternatively, the device may be left connected to the seat belt. Because of its compact construction, the device will not interfere with the proper functioning of the seat belt when remaining in face-to-face engagement with the webbing.

The invention claimed is:

1. A device for facilitating threading of a seat belt through a passageway of a child safety seat, said seat belt including seat belt webbing and a seat belt tongue having a wide tongue portion mounted on said webbing, said device comprising, in combination:

an elongated, double-ended threader member; and first connector structure attached to said threader member for releasable connection to the seat belt tongue of the seat belt and defining at least one opening for receiving the wide tongue portion, said elongated, double-ended threader member, when said first connector structure is connected to the seat belt tongue being positioned alongside a portion of said seat belt webbing and operable to resist substantial flexing of said portion of said seat belt webbing adjacent to said first connector structure, said first connector structure including a pair of loop elements formed of flexible, elastic material whereby said pair of loop elements are frictionally engageable with and extend about said wide tongue portion at different locations thereon to maintain said seat belt tongue releasably connected to the device when the device is employed to push the seat belt tongue through the passageway.

2. The device according to claim 1 wherein said threader member comprises a substantially flat push element having opposed webbing engagement sides for face-to-face engagement with superposed portions of said seat belt webbing, the pusher element being located between said superposed portions when the device is employed to thread the seat belt through the passageway.

3. The device according to claim 2 wherein said pusher element is formed of relatively stiff material.

\* \* \* \* \*